US012749338B2

(12) United States Patent
Shimizu

(10) Patent No.: US 12,749,338 B2
(45) Date of Patent: Sep. 29, 2026

(54) IMAGE PROCESSING DEVICE, IMAGE PROCESSING METHOD, AND PROGRAM

(71) Applicant: NEC Corporation, Tokyo (JP)

(72) Inventor: Yuta Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 296 days.

(21) Appl. No.: 18/280,308

(22) PCT Filed: Mar. 12, 2021

(86) PCT No.: PCT/JP2021/010066

§ 371 (c)(1),
(2) Date: Sep. 5, 2023

(87) PCT Pub. No.: WO2022/190358

PCT Pub. Date: Sep. 15, 2022

(65) Prior Publication Data

US 2024/0071135 A1 Feb. 29, 2024

(51) Int. Cl.
*G06V 40/16* (2022.01)
*G06V 10/24* (2022.01)

(52) U.S. Cl.
CPC ............ *G06V 40/172* (2022.01); *G06V 10/24* (2022.01); *G06V 40/171* (2022.01)

(58) Field of Classification Search
CPC .... G06V 40/172; G06V 10/24; G06V 40/171; G06V 10/242; G06V 10/761; G06V 40/168; G06V 20/59
See application file for complete search history.

(56) References Cited

U.S. PATENT DOCUMENTS

| | | | | |
|---|---|---|---|---|
| 8,165,352 | B1 * | 4/2012 | Mohanty | G06F 18/2137 382/118 |
| 8,311,293 | B2 * | 11/2012 | Okada | G06V 30/244 382/118 |
| 9,251,402 | B2 * | 2/2016 | Sun | G06V 40/16 |
| 9,323,980 | B2 * | 4/2016 | Sun | G06V 40/172 |
| 9,928,407 | B2 * | 3/2018 | Ganong | G06V 40/172 |
| 10,129,460 | B2 * | 11/2018 | Stubler | G06V 40/166 |
| 11,216,968 | B2 * | 1/2022 | Torama | H04N 23/21 |

(Continued)

FOREIGN PATENT DOCUMENTS

| | | |
|---|---|---|
| JP | 2000-322577 A | 11/2000 |
| JP | 2006-168553 A | 6/2006 |

(Continued)

OTHER PUBLICATIONS

International Search Report for PCT Application No. PCT/JP2021/010066, mailed on Jun. 8, 2021.

(Continued)

*Primary Examiner* — Wesley J Tucker
(74) *Attorney, Agent, or Firm* — Sughrue Mion, PLLC

(57) ABSTRACT

A captured image showing face images of a plurality of persons is identified. Each face image of the plurality of persons shown in the captured image are compared with registered face images, and a registered image including a face most similar to a face of the person shown in the captured image is identified, as a matching target to be matched against the face image of the person shown in the captured image.

6 Claims, 5 Drawing Sheets

(56) References Cited

U.S. PATENT DOCUMENTS

| | | | | |
|---|---|---|---|---|
| 2004/0228505 | A1* | 11/2004 | Sugimoto | G06V 40/161 382/209 |
| 2007/0127785 | A1* | 6/2007 | Hiraizumi | G06V 40/175 382/118 |
| 2008/0304749 | A1* | 12/2008 | Ogawa | G06V 40/175 382/190 |
| 2009/0059061 | A1 | 3/2009 | Yu et al. | |
| 2009/0196467 | A1* | 8/2009 | Okubo | G06V 10/772 382/118 |
| 2012/0063671 | A1* | 3/2012 | Yamada | G06V 40/40 382/154 |
| 2012/0170817 | A1 | 7/2012 | Yang et al. | |
| 2014/0200737 | A1 | 7/2014 | Lortz et al. | |
| 2016/0110588 | A1* | 4/2016 | Ikenoue | G06V 40/50 382/118 |
| 2017/0193206 | A1* | 7/2017 | Vadlamudi | G06F 21/83 |
| 2018/0239955 | A1* | 8/2018 | Rodriguez | G06V 40/171 |
| 2021/0224518 | A1* | 7/2021 | Choi | G06T 7/593 |
| 2022/0327191 | A1* | 10/2022 | Hama | G06V 40/172 |
| 2025/0063248 | A1* | 2/2025 | Shimizu | H04N 23/611 |
| 2025/0069435 | A1* | 2/2025 | Shimizu | G06V 40/172 |
| 2025/0071408 | A1* | 2/2025 | Shimizu | H04N 23/71 |
| 2025/0080855 | A1* | 3/2025 | Shimizu | H04N 23/70 |
| 2025/0166420 | A1* | 5/2025 | Shimizu | G06V 40/171 |

FOREIGN PATENT DOCUMENTS

| | | | |
|---|---|---|---|
| JP | 2008-071366 | A | 3/2008 |
| JP | 2011-150497 | A | 8/2011 |
| WO | 2018/110012 | A1 | 6/2018 |
| WO | 2018/173947 | A1 | 9/2018 |

OTHER PUBLICATIONS

Extended European Search Report for EP Application No. 21930210.6, dated on Mar. 6, 2024.

Su Hongtao et al: "Face recognition method using mutual information and hybrid feature", Computational Intelligence and Multimedia Applications, 2003. ICCIMA 2003. Proceedings. Fifth International Conference on Sep. 27-30, 2003, Piscataway, NJ, USA, IEEE, Sep. 27, 2003 (Sep. 27, 2003), pp. 436-440, XP010661692, ISBN: 978-0-7695-1957-9.

Tetsuya Izumi et al: "Face recognition for images of persons against a general background using approximate parameter estimation of affine transform", Electronics and Communications in Japan, Wiley-Blackwell Publishing, Inc, US, vol. 92, No. 11, Oct. 7, 2009 (Oct. 7, 2009), pp. 1-8, XP072447913, ISSN: 1942-9533, DOI: 10.1002/ECJ.10152.

EP Office Action for EP Application No. 21930210.6, mailed on Nov. 24, 2025.

* cited by examiner

IMAGE PROCESSING DEVICE, IMAGE PROCESSING METHOD, AND PROGRAM

This application is a National Stage Entry of PCT/JP2021/010066 filed on Mar. 12, 2021, the contents of all of which are incorporated herein by reference, in their entirety.

TECHNICAL FIELD

The present invention relates to an image processing device, an image processing method, and a program.

BACKGROUND ART

There has been know a technique of using a face shown in a captured image to perform matching processing such as authentication. Patent Document 1 discloses a technique of generating an image having the same orientation as a subject in a database image and comparing and matching the image.

PRIOR ART DOCUMENTS

Patent Documents

Patent Document 1: Japanese Unexamined Patent Application, First Publication No. 2000-322577

SUMMARY OF THE INVENTION

Problems to be Solved by the Invention

There is a demand for the development of a technique for improving the completion speed up to completing matching processing performed on persons shown in a captured image as describe above.

Thus, an example object of the present invention is to provide an image processing device, an image processing method, and a program for solving the above problem.

Means for Solving the Problem

According to a first example aspect of the present invention, an image processing device includes: a captured image identification means that identifies a captured image showing face images of a plurality of persons; and a matching target identification means that compares each face image of the plurality of persons shown in the captured image with registered face images, and identifies, as a matching target to be matched against the face image of the person shown in the captured image, a registered image including a face most similar to a face of the person shown in the captured image.

According to a second example aspect of the present invention, an image processing method includes: identifying a captured image showing face images of a plurality of persons; and comparing each face image of the plurality of persons shown in the captured image with registered face images, and identifying, as a matching target to be matched against the face image of the person shown in the captured image, a registered image including a face most similar to a face of the person shown in the captured image.

According to a third example aspect of the present invention, a program causes a computer of an image processing device to function as: a captured image identification means that identifies a captured image showing face images of a plurality of persons; and a matching target identification means that compares each face image of the plurality of persons shown in the captured image with registered face images, and identifies, as a matching target to be matched against the face image of the person shown in the captured image, a registered image including a face most similar to a face of the person shown in the captured image.

Effect of Invention

According to the present invention, it is possible to improve the completion speed up to completing matching processing performed on persons shown in a captured image.

EXAMPLE EMBODIMENT

Hereinafter, an image processing device according to an example embodiment of the present invention will be described, with reference to the drawings.

Figure 1:
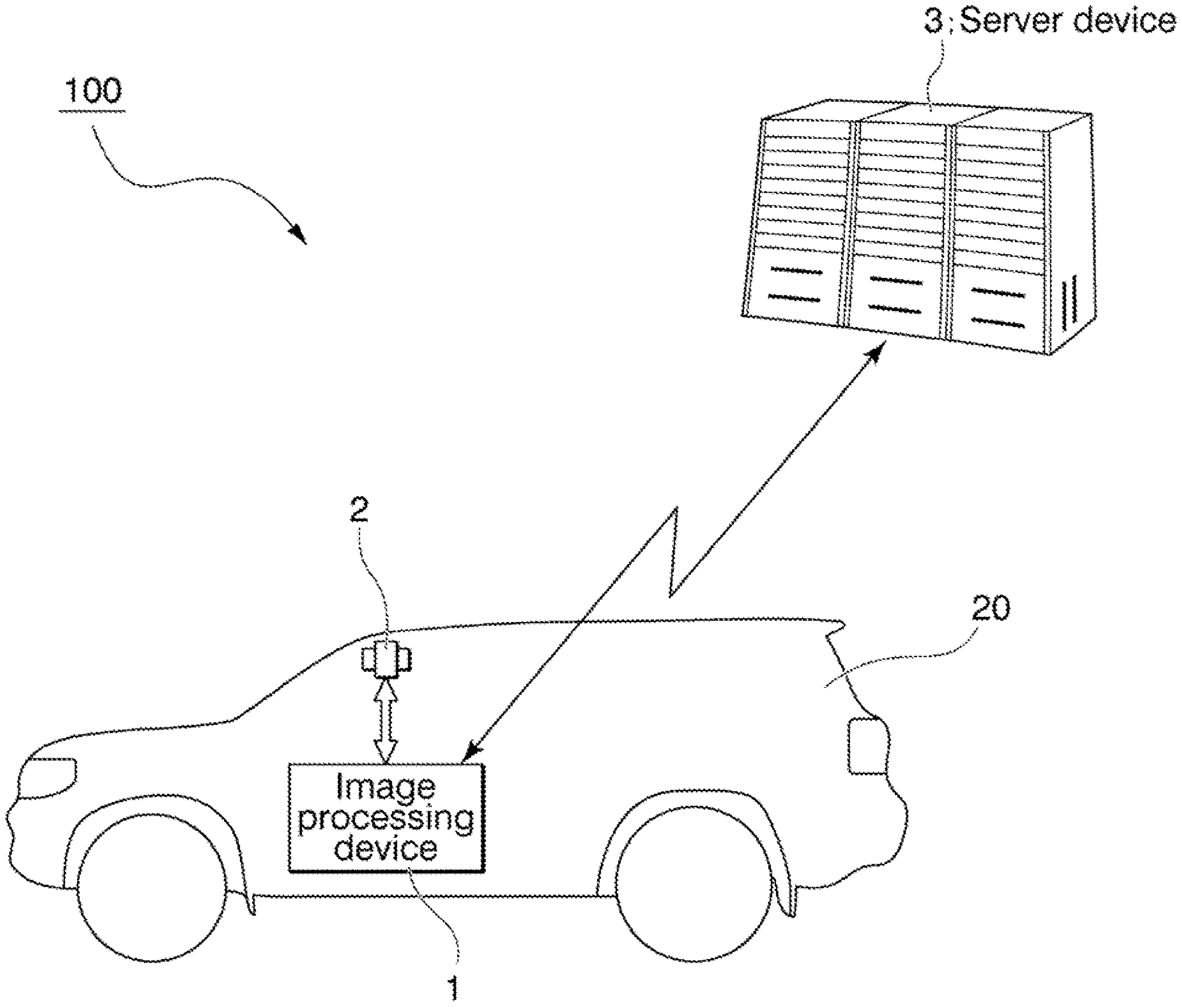
FIG. 1 is a diagram showing a schematic configuration of an image processing system according to the present example embodiment.

FIG. 1 is a diagram showing an overview of an image processing system including an image processing device according to the present example embodiment.

As shown in FIG. 1, an image processing system 100 is configured such that at least an image processing device 1 and a camera 2 mounted in a vehicle 20 are connected to each other via a wireless communication network or a wired communication network. The image processing system 100 may include a server device 3. The server device 3 may be connected to and communicate with the image processing device 1 and the camera 2. The camera 2 outputs a captured image generated by the image capturing processing to the image processing device 1. The image processing device 1 uses the captured image acquired from the camera 2 to perform matching processing on a person shown in the captured image.

Figure 2:
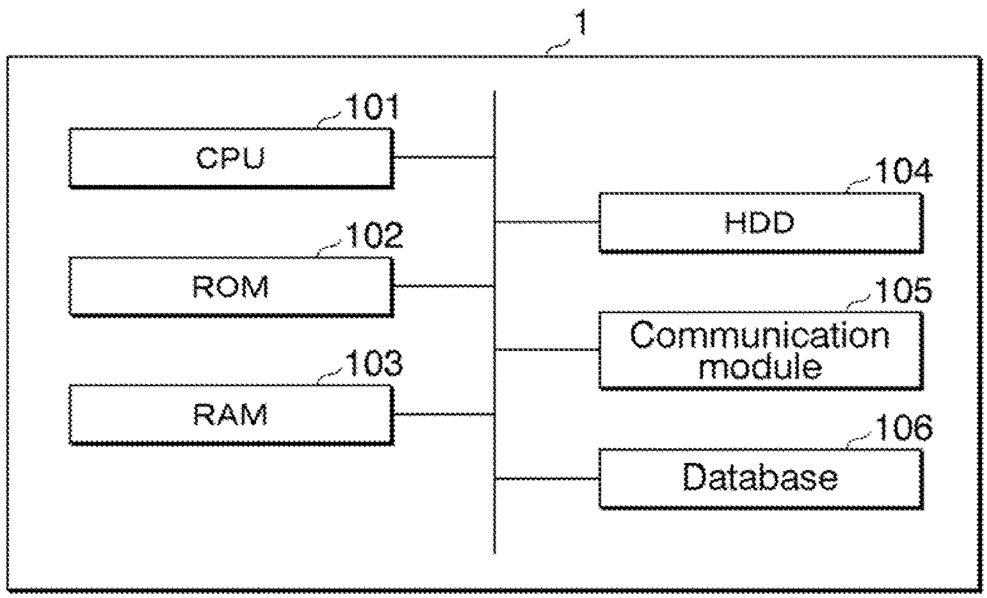
FIG. 2 is a hardware configuration diagram of an image processing device according to the present example embodiment.

FIG. 2 is a hardware configuration diagram of the image processing device.

As shown in this figure, the image processing device 1 is a computer that includes hardware units such as a CPU (Central Processing Unit) 101, a ROM (Read Only Memory) 102, a RAM (Random Access Memory) 103, a HDD (Hard Disk Drive) 104, a communication module 105, and a database 106. It should be noted that the server device 3 is also of a similar configuration.

Figure 3:
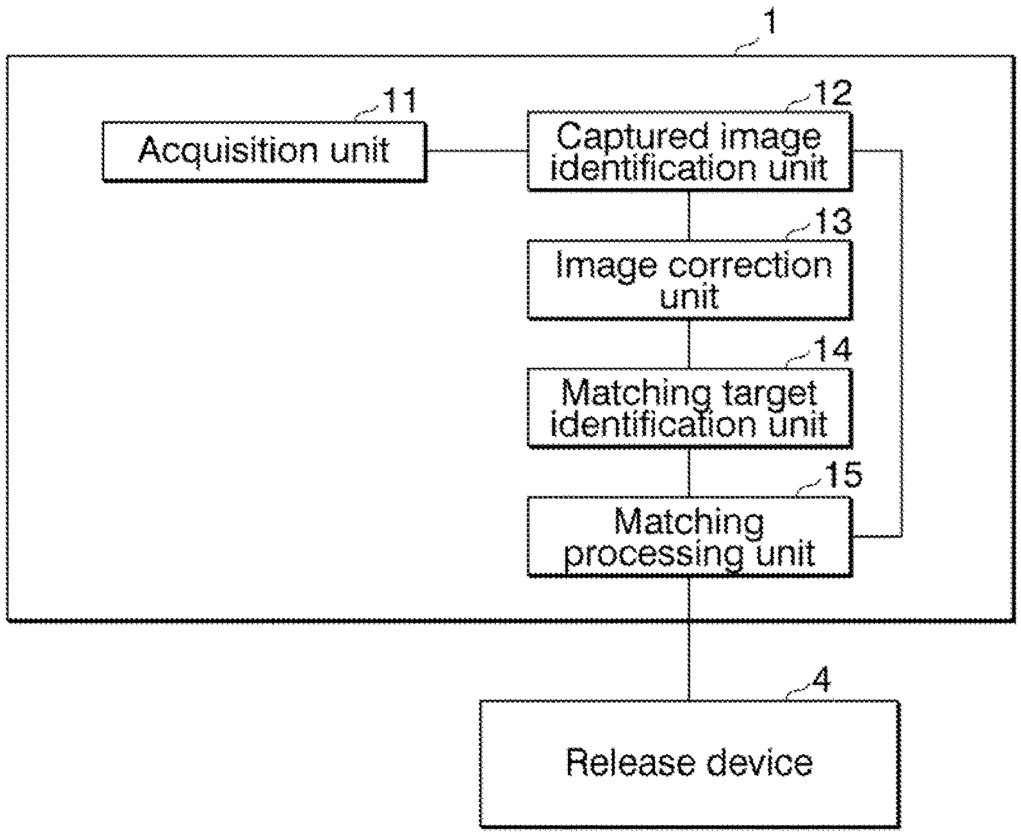
FIG. 3 is a function block diagram of the image processing device according to the present example embodiment.

FIG. 3 is a function block diagram of the image processing device.

The image processing device 1 uses the power supply of a battery of the vehicle 20 to stay active at all times even when the engine of the vehicle 20 is stopped, and executes an image processing program that is preliminarily stored. As a result, the image processing device 1 serves the functions of an acquisition unit 11, a captured image identification unit 12, an image correction unit 13, a matching target identification unit 14, and a matching processing unit 15.

The acquisition unit 11 acquires captured images from the camera 2.

The captured image identification unit 12 identifies, from among the acquired captured images, a captured image with the face images of a plurality of persons shown therein.

The image correction unit 13 applies orientation modification processing for matching face orientations between the face image of a person shown in the captured image and a registered face image, to either the face image of the person shown in the captured image or the registered image.

The matching target identification unit 14 uses the face image of the person shown in the captured image or the registered image that has undergone the orientation modification processing, compares each face image of the persons shown in the captured image with registered face images, and identifies, as a matching target to be matched against the face image of the person shown in the captured image, a registered image including the face most similar to the face of the person shown in the captured image.

The matching processing unit 15 performs processing for matching the registered image identified as a matching target, with the face image included in the captured image.

Figure 4:
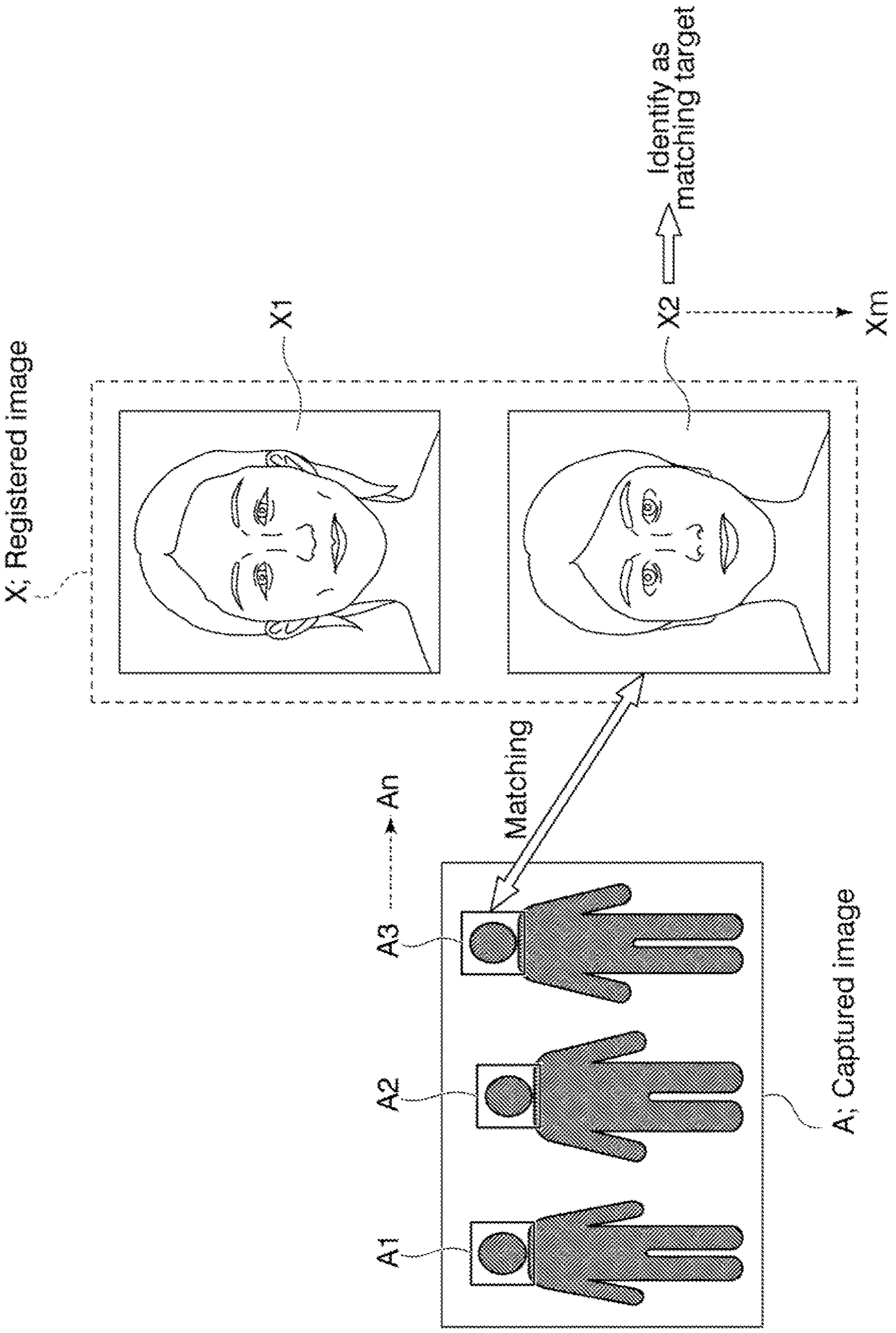
FIG. 4 is a diagram showing an overview of processing of the image processing device according to the present example embodiment.

FIG. 4 is a diagram showing an overview of processing of the image processing device.

FIG. 4 shows a captured image A and a registered image X. The captured image A is a captured image generated by the image capturing processing of the camera 2. From among the captured images A acquired from the camera 2, the image processing device 1 identifies a captured image A with face images of a plurality of persons shown therein as processing targets. Where n represents the number of persons in the captured image A, the image processing device 1 acquires face images An obtained by cutting out faces of the persons from the captured image A.

Registered images X are registered preliminarily in a storage unit of the image processing device 1. Assume that a plurality of images, namely, a first registered image X1, a second registered image X2 (m-th registered image Xm), and so on are registered in the image processing device 1. The first registered image X1 is an image showing the face of a first user who is allowed to drive the vehicle 20, and the second registered image X2 is an image showing the face of a second user who is allowed to drive the vehicle 20. For example, the first user, himself or herself, registers the first registered image X1 in the image processing device 1, and the second user, himself or herself, registers the second registered image X2 in the image processing device 1. The first user and the second user are, for example, members of a family that owns the vehicle 20.

In this situation, the image processing device 1 acquires the captured image A generated by the camera 2 when the vehicle 20 is in a stop state, and if a plurality (n) of persons are captured in the captured image A, identifies a matching target that corresponds to a face image An from a plurality of registered images Xm, based on the face images An of the plurality of (n) persons. For example, assume that among registered images X1 and X2, the registered image X2 is identified as a matching target for a face image A3 included in the captured image A. The image processing device 1 compares the registered image X2, which has been identified as a matching target, with the face image A3 of a person shown in the captured image A, to perform matching processing.

According to such processing, the matching processing is performed using the registered image X2 showing a face similar to the face of the person shown in the captured image A among the plurality of registered images Xm. Therefore, it is possible to reduce the amount of time taken to complete the matching processing performed on the face image An of the person shown in the captured image A. It should be noted that in order to identify a matching target image from the plurality of registered images Xm, the image processing device 1 performs orientation modification processing for matching the face orientation between the face image An of the person shown in the captured image A and the registered face image Xm, on at least either the face image An of the person shown in the captured image A or the registered image Xm.

Figure 5:
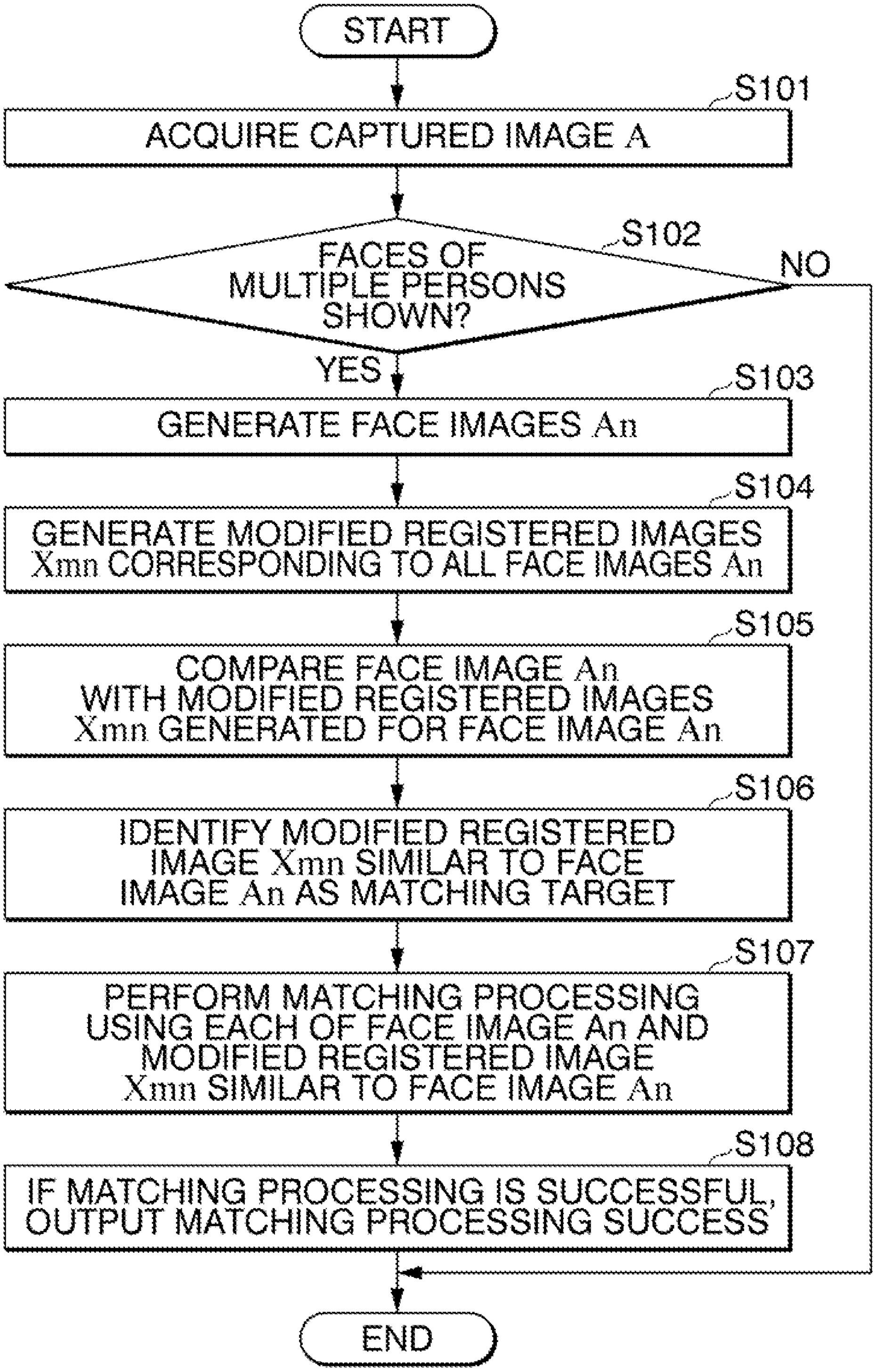
FIG. 5 is a diagram showing a processing flow of the image processing device according to the present example embodiment.

FIG. 5 is a diagram showing a processing flow of the image processing device.

Next, the processing flow of the image processing device will be described in a step-by-step manner.

First, even when the engine of the vehicle 20 is in the stop state, the camera 2 operates on the electric power of the battery of the vehicle 20 serving as its power supply and generates a captured image A. The camera 2 may recognize, by means of a commonly known human recognition technique, that a person is captured in a captured image A, and generate a captured image A when the person is captured. The camera 2 transmits the captured image A to the image processing device 1. The camera 2 may be activated upon being triggered by communication performed with a device carried by the owner of the vehicle 20 to perform the capturing processing.

The acquisition unit 11 of the image processing device 1 acquires the captured image A (Step S101). The acquisition unit 11 outputs the captured image A to the captured image identification unit 12. The captured image identification unit 12 determines whether or not the faces of a plurality of persons are shown in the captured image identification unit A (Step S102). The captured image identification unit 12 may use a commonly known face recognition technique to determine whether or not a face is captured in the captured image A, and may determine whether or not faces of a plurality of persons are shown in the captured image A by determining if the number of the faces are two or more. If faces of a plurality of persons are determined as being shown in the captured image A, the captured image identification unit 12 outputs the captured image A to the image correction unit 13 and the matching target identification unit 14. It should be noted that the captured image identification unit 12 may identify and output a captured image in which face images of a plurality of persons are equal to or larger than a predetermined size in the captured image.

The image correction unit 13 generates a face image A1, a face image A2, and a face image A3 (face images An) of the plurality of persons shown in the captured image A (Step S103). For example, the image correction unit 13 sets rectangular ranges in the captured image A so as to include the faces of the plurality of persons shown in the captured image 42. If, for example, the faces of three persons are shown in the captured image A, the image correction unit 13 cuts out the face images within the rectangular ranges as a face image A1, a face image A2, a face image A3, . . . , and a face image An.

Based on the first face image A1 shown in the captured image A, the image correction unit 13 calculates an orientation vector a1 of the face. The image correction unit 13 calculates the orientation vector a1 of the face image A1 based on the positions of parts that form the face, such as eyes, nose, and mouth, in the face image A1, for example. Alternatively, the image correction unit 13 may calculate the orientation vector a1 of the face image A1 based on the positions of feature points. The image correction unit 13 may use a commonly known technique to perform calculation of the orientation vector a1 that uses positions of parts that form a face or feature points of the face. Alternatively, the image correction unit 13 may input the positions of the parts that form the face or the feature points of the face into a neural network that uses an orientation vector calculation model calculated by machine learning, and may calculate the orientation vector a1 as a result of that. The orientation vector calculation model may be a result of inputting the positions of parts that form a face or feature points of a face and performing machine learning using the orientation vector a1 of the face in that case as true data.

After calculating the face orientation vector a1 of the face image A1, the image correction unit 13 modifies the registered image X1 so that the face orientation vector x1 of the registered image X1 matches the face orientation vector a1 of the face image A1. The face orientation vector x1 of the registered image X1 may be recorded as information of the registered image X1. Alternatively, the image correction unit 13 may calculate the face orientation vector x1 of the registered image X1 in the same manner as that of calculating the face orientation vector a1 of the face image A1. The image correction unit 13 uses the orientation vector x1 of the registered image X1 and the orientation vector a1 of the face image A1 to generate a conversion matrix that converts the direction of the orientation vector x1 of the registered image X1 into the orientation vector a1, and generates a modified registered image X11 in which the orientation of the registered image X1 has been modified based on the conversion matrix. Another commonly known technique may be used to generate the modified registered image X11.

Thus, the image correction unit 13 similarly generates modified registered images Xmn that correspond to all of the face images An acquired from the captured image A (Step S104). That is to say, in the case where there are two registered images X, namely, the registered image X1 and the registered image X2, the image correction unit 13 generates modified registered images X11, X21 corresponding to the face image A1, modified registered images X12, X22 corresponding to the face image A2, and modified registered images X13, X23 corresponding to the face image A3. The image correction unit 13 outputs the face images An and the modified registered images Xmn to the matching target identification unit 14.

The matching target identification unit 14 compares the face image An with the modified registered images Xmn generated with respect to the face image An (Step S105). The matching target identification unit 14 identifies the modified registered image Xmn similar to the face image An as a matching target (Step S106).

That is to say, the matching target identification unit 14 compares the face image A1 with the modified registered images X11, X21 corresponding to the face image A1. As a result of comparing the face image A1 with the modified registered images X11, X21 corresponding to the face image A1, the matching target identification unit 14 determines the modified registered image Xm1 that is similar to the face image A1 as a matching target corresponding to the face image A1.

Moreover, the matching target identification unit 14 compares the face image A2 with the modified registered images X12, X22 corresponding to the face image A2. As a result of comparing the face image A2 with the modified registered images X12, X22 corresponding to the face image A2, the matching target identification unit 14 determines the modified registered image Xm2 that is similar to the face image A2 as a matching target corresponding to the face image A2.

Moreover, the matching target identification unit 14 compares the face image A3 with the modified registered images X13, X23 corresponding to the face image A3. As a result of comparing the face image A3 with the modified registered images X13, X23 corresponding to the face image A3, the matching target identification unit 14 determines the modified registered image Xm3 that is similar to the face image A3 as a matching target corresponding to the face image A2.

The matching target identification unit 14 outputs the face images An and the modified registered images Xmn similar to the face images An to the matching processing unit 15. The matching processing unit 15 performs matching processing, using each face image An and corresponding modified registered images Xmn similar to the face image An (Step S107). That is to say, the matching processing unit 15 compares the face image A1 with the modified registered images Xm1 similar to the face image A1 to perform the matching processing. Also, the matching processing unit 15 compares the face image A2 with the modified registered images Xm2 similar to the face image A2 to perform the matching processing. Furthermore, the matching processing unit 15 compares the face image A3 with the modified registered images Xm3 similar to the face image A3 to perform the matching processing. A commonly known technique may be used for the matching processing performed by the matching processing unit 15.

Through the processing described above, it is sufficient that the image processing device 1 perform matching processing once for the face image A1 shown in the captured image A, using only the modified registered images Xm1 among the registered images Xm; perform matching processing once for the face image A2 shown in the captured image A, using only the modified registered images Xm2 among the registered images Xm; and perform matching processing once for the face image A3 shown in the captured image A, using only the modified registered images Xm3 among the registered images Xm. As a result, there is no need to perform matching processing in an exhaustive manner between each face image An of the plurality of persons shown in the captured image A and the registered images Xm. The image processing device 1 is thus capable of improving the completion speed of matching processing performed on persons shown in a captured image.

The matching processing unit 15 outputs matching processing success in any one of cases: where the matching processing between the face image A1 and the modified registered images Xm1 is successful; where the matching processing between the face image A2 and the modified registered images Xm2 is successful; and where the matching processing between the face image A3 and the modified registered images Xm3 is successful (Step S108). For example, the matching processing unit 15 outputs matching processing success to a door lock release device 4 of the vehicle 20. The door lock release device 4 of the vehicle 20 unlocks the doors when matching processing success is input from the image processing device 1. That is to say, if any face image An in the captured image A matches the modified registered image Xmn using the registered images Xm, then the captured image A includes a person whose face is included in the registered images Xm, and the release device 4 therefore unlocks the doors of the vehicle 20.

In the processing of the image processing device 1 described above, the face orientation vector of the registered image Xm is changed so as to match the orientation vector of the face image An included in the captured image A. However, a modified face image Anm may be generated in which the face image An is modified by matching the orientation vector of the face image An with the face orientation vector of the registered image Xm. In such a case, the image processing device 1 compares the modified face image Anm with the registered image Xm, and identifies the registered image Xm similar to the modified face image Anm as a matching target image for the modified face image Anm.

Moreover, in the processing of the image processing device 1 described above, in the case where the brightness of the captured image A and the brightness of the registered image Xm differ from each other, the brightness value of either one of the images may be adjusted so that the brightnesses of both images are approximately the same, after which the modified registered image Xmn similar to the face image An may be identified as a matching target.

Either one of the following first comparison processing and second comparison processing is performed in the processing of the matching target identification unit 14 in Step S105 and Step S106 of the image processing device 1 described above.

(First Comparison Process)

The matching target identification unit 14 compares the color information (pixel value) of each pixel of the face image An and the color information (pixel value) of each pixel of the modified registered image Xmn, for each pixel at corresponding positions, and calculates the difference between the face image An and the modified registered image Xmn corresponding to the face image An. The difference between this face image An and the modified registered image Xmn corresponding to the face image An may be obtained as an integrated value of differences in pixels at corresponding positions. The smaller this integrated value of differences the higher the degree of similarity between this face image An and the modified registered image Xmn corresponding to the face image An. The matching target identification unit 14 may also use another method to calculate the degree of similarity between the color information of the face image An and the color information of the modified registered image Xmn corresponding to the face image An. The matching target identification unit 14 identifies the modified registered image Xmn having the highest similarity to the face image An as a matching target.

(Second Comparison Process)

The matching target identification unit 14 calculates the difference between the facial feature information included in the face image An and the facial feature information included in the modified registered image Xmn. The difference between this feature information of the face image An and the feature information of the modified registered image Xmn corresponding to the face image An may be obtained as an integrated value of shifts in the feature point positions of the faces. The smaller this integrated value of differences the higher the degree of similarity between this face image An and the modified registered image Xmn corresponding to the face image An. The matching target identification unit 14 may also use another method to calculate the degree of similarity between the feature information of the face image An and the feature information of the modified registered image Xmn corresponding to the face image An. The matching target identification unit 14 identifies the modified registered image Xmn having the highest similarity to the face image An as a matching target.

According to the processing described above, the image processing device 1 provided in the vehicle 20 performs the above processing. However, a drive recorder equipped with the camera 2, or the external server device 3 may have the same functions as those of the image processing device 1 to perform the processing of identifying a matching target from among registered images, and the matching processing, in the same manner as the processing described above.

Furthermore, according to the processing described above, the image processing device 1 stores the registered images Xm. However, the server device 3 may store the registered images Xm, and the image processing device 1 may acquire the registered images Xm stored in the server device 3 to perform the above processing.

Figure 6:
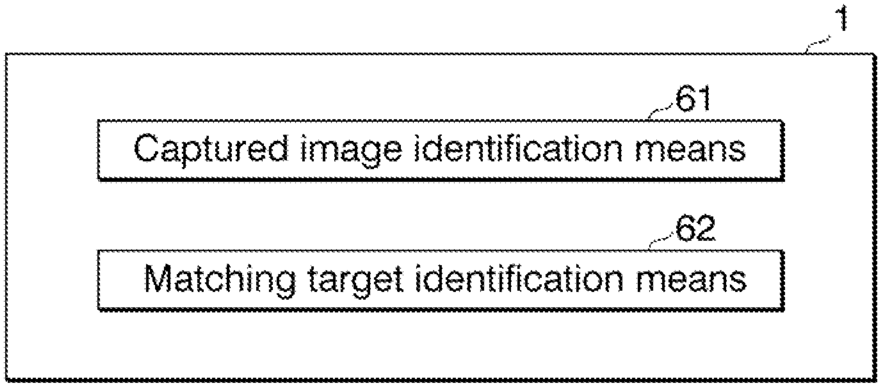
FIG. 6 is a diagram showing a minimum configuration of the image processing device according to the present example embodiment.

FIG. 6 is a diagram showing a minimum configuration of the image processing device.

Figure 7:
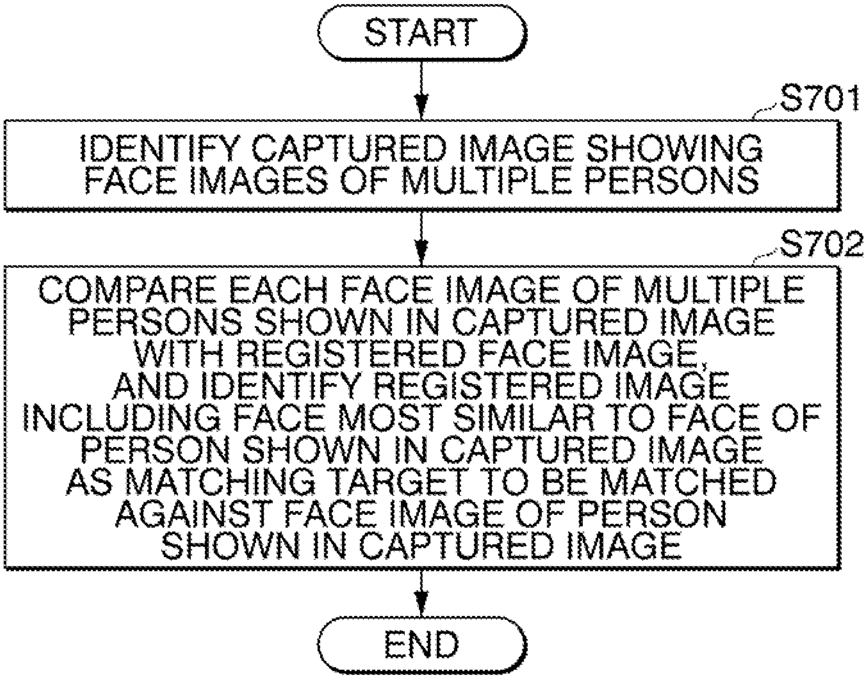
FIG. 7 is a diagram showing a processing flow of the image processing device with a minimum configuration according to the present example embodiment.

FIG. 7 is a diagram showing a processing flow of the image processing device with the minimum configuration.

The image processing device 1 includes at least a captured image identification means 61 and a matching target identification means 62.

The captured image identification means 61 identifies a captured image with face images of a plurality of persons shown therein (Step S701).

The matching target identification means 62 compares each face image of the plurality of persons shown in the captured image with registered face images, and identifies, as a matching target to be matched against the face images of the persons shown in the captured image, a registered image including a face most similar to the face of a person shown in the captured image (Step S702).

Each device described above has a built-in computer system. The process of each processing described above is stored in a computer-readable recording medium in the form of a program, and the processing mentioned above is performed by a computer reading and executing the program. Here, the computer-readable recording medium refers to a magnetic disk, a magnetic optical disk, a CD-ROM, a DVD-ROM, a semiconductor memory, or the like. Moreover, the computer program may be distributed to a computer via a communication line, and the computer having received the distributed program may execute the program.

Also, this program may be a program for realizing some of the functions described above. Furthermore, the program may be a so-called difference file (a difference program) which can realize the functions described above in combination with a program already recorded in the computer system.

DESCRIPTION OF REFERENCE SYMBOLS

1 Image processing device
2 Camera
3 Server device
11 Acquisition unit

12 Captured image identification unit
13 Image correction unit
14 Matching target identification unit
15 Matching processing unit

What is claimed is:

1. An image processing device comprising:
a memory configured to store instructions; and
a processor configured to execute the instructions to:
identify a captured image showing face images of a plurality of persons;
acquire, from the captured image, a plurality of face images that respectively correspond to the plurality of persons;
perform, for each of the plurality of face images, an orientation modification processing for modifying a face orientation of each of a plurality of registered face images to an orientation that matches an orientation of a face of the corresponding face image among the plurality of face images, to generate, for each of the plurality of face images, the plurality of registered face images that have undergone the orientation modification processing; and
compare, for each of the plurality of face images, pixel values of each pixel between the face image with the generated plurality of registered face images, and identify, as a matching target to be matched against the face image of the person shown in the captured image, a registered image including a face most similar to a face of the person shown in the captured image.

2. The image processing device according to claim 1, wherein the processor is configured to execute the instructions to identify, as the matching target, a corresponding registered image similar to each face image of the plurality of persons shown in the captured image.

3. The image processing device according to claim 1, wherein the processor is configured to execute the instructions to identify the captured image in which face images of the plurality of persons are equal to or larger than a predetermined size in the captured image.

4. The image processing device according to claim 1, wherein the processor is configured to execute the instructions to perform processing for matching with the face image included in the captured image by using the face image of the matching target.

5. An image processing method comprising:
identifying a captured image showing faces of a plurality of persons;
acquiring, from the captured image, a plurality of face images that respectively correspond to the plurality of persons;
performing, for each of the plurality of face images, an orientation modification processing for modifying a face orientation of each of a plurality of registered face images to an orientation that matches an orientation of a face of the corresponding face image among the plurality of face images, to generate, for each of the plurality of face images, the plurality of registered face images that have undergone the orientation modification processing; and
comparing, for each of the plurality of face images, pixel values of each pixel between the face image with the generated plurality of registered face images, and identifying, as a matching target to be matched against the face image of the person shown in the captured image, a registered image including a face most similar to a face of the person shown in the captured image.

6. A non-transitory computer-readable recording medium that stores a program that causes a computer of an image processing device to execute:
identifying a captured image showing faces of a plurality of persons;
acquiring, from the captured image, a plurality of face images that respectively correspond to the plurality of persons;
performing, for each of the plurality of face images, an orientation modification processing for modifying a face orientation of each of a plurality of registered face images to an orientation that matches an orientation of a face of the corresponding face image among the plurality of face images, to generate, for each of the plurality of face images, the plurality of registered face images that have undergone the orientation modification processing; and
comparing, for each of the plurality of face images, pixel values of each pixel between the face image with the generated plurality of registered face images, and identifying, as a matching target to be matched against the face image of the person shown in the captured image, a registered image including a face most similar to a face of the person shown in the captured image.

* * * * *